United States Patent
Mattice (10) Patent No.: US 7,648,670 B2
(45) Date of Patent: Jan. 19, 2010

(54) APPARATUS AND METHOD FOR INVERTING A STOP FLANGE ON A TAMPER-INDICATING CLOSURE

(75) Inventor: Daniel L. Mattice, Columbia City, IN (US)

(73) Assignee: Rexam Closure Systems Inc., Perrysburg, OH (US)

( * ) Notice: Subject to any disclaimer, the term of this patent is extended or adjusted under 35 U.S.C. 154(b) by 98 days.

(21) Appl. No.: 11/983,312

(22) Filed: Nov. 8, 2007

(65) Prior Publication Data

US 2008/0067718 A1  Mar. 20, 2008

Related U.S. Application Data

(62) Division of application No. 11/156,113, filed on Jun. 17, 2005, now Pat. No. 7,314,366.

(51) Int. Cl.
B29C 53/02 (2006.01)
B29C 53/34 (2006.01)
B65D 41/34 (2006.01)

(52) U.S. Cl. .................. 264/339; 425/393; 215/258; 215/256

(58) Field of Classification Search .......... 264/339, 264/320, 296, 295; 425/393; 215/252, 256, 215/258
See application file for complete search history.

(56) References Cited

U.S. PATENT DOCUMENTS

| | | | |
|---|---|---|---|
| 3,420,927 A | 1/1969 | Corrinet | |
| 3,912,438 A * | 10/1975 | Padovani | 425/292 |
| 4,474,723 A * | 10/1984 | Irmer | 264/296 |
| 4,497,765 A | 2/1985 | Wilde et al. | |
| 4,592,475 A | 6/1986 | Hannon et al. | |
| 4,653,657 A | 3/1987 | Papavasilopoulos | |
| 4,709,824 A * | 12/1987 | Thompson | 215/252 |
| 4,721,218 A | 1/1988 | Gregory et al. | |
| 5,007,545 A | 4/1991 | Imbery, Jr. | |
| 5,086,938 A | 2/1992 | Aichinger | |
| 5,090,788 A | 2/1992 | Ingram et al. | |
| 5,219,507 A | 6/1993 | Ingram et al. | |
| 5,370,520 A | 12/1994 | Ingram et al. | |
| 5,443,171 A | 8/1995 | Sprowl | |
| 5,462,184 A | 10/1995 | Ingram et al. | |
| 5,611,446 A | 3/1997 | Ingram et al. | |
| 5,690,882 A | 11/1997 | Sprowl | |
| 2001/0028902 A1 | 10/2001 | Pascal et al. | |

FOREIGN PATENT DOCUMENTS

DE  298 09 926  12/1998

* cited by examiner

Primary Examiner—Matthew J. Daniels
(74) Attorney, Agent, or Firm—Reising Ethington PC (57) ABSTRACT

An apparatus for inverting the stop flange on a tamper-indicating closure, from an axially outwardly oriented position as molded to an axially inwardly oriented position for use, includes a support base for supporting the closure such that the stop flange as molded is spaced from and oriented away from the support base. A pedestal is movably carried by the support base at a position spaced from the support base. A locator ring is carried by the pedestal and movable with the pedestal to engage the stop flange on a closure carried by the support base and to bend the stop flange radially inwardly. An inversion ring moves through the locator ring to engage and invert the stop flange that is bent radially inwardly by the locator ring.

5 Claims, 8 Drawing Sheets

APPARATUS AND METHOD FOR INVERTING A STOP FLANGE ON A TAMPER-INDICATING CLOSURE

This application is a division of application Ser. No. 11/156,113 filed Jun. 17, 2005 now U.S. Pat. No. 7,314,366.

The present disclosure relates to tamper-indicating closures, and more particularly to an apparatus and method for inverting the stop flange on the tamper band of a tamper-indicating closure.

BACKGROUND AND OBJECTS OF THE DISCLOSURE

One type of tamper-indicating closure includes a shell having a cylindrical skirt with one or more internal thread segments for threading the closure shell onto a container finish. A tamper band is frangibly connected to the edge of the skirt, and a stop flange extends radially inwardly and axially upwardly to engage an external bead on the container finish. When the closure initially is unthreaded from the container finish, the stop flange prevents axial movement of the tamper band, so that the tamper band is separated from the closure skirt to indicate that the package has been opened. Closures of this type are exemplified by U.S. Pat. Nos. 4,613,052, 5,197,620, 5,650,113, 6,053,344 and 6,224,802.

Tamper-indicating closures of the subject type can be made by compression molding or injection molding. In either type of molding process, the stop flange that extends from the tamper band is oriented axially outwardly of the closure as molded to facilitate molding and stripping of the closure from the mold. The stop flange must be inverted, from the axially outward orientation as molded to an axially inward orientation for use, prior to placement of the closure on a container finish. U.S. Pat. Nos. 4,653,657 and 4,721,218 illustrate a technique for stop flange inversion wherein a roller is engaged with the stop flange and the closer is rotated so that the stop flange progressively is inverted as a function of rotation of the closure. U.S. Pat. Nos. 5,090,788 and 5,443,171 illustrate another technique for stop flange inversion in which the edge of the stop flange is engaged by the shoulder of a plunger or mandrel to fold the stop flange bodily inwardly in a single operation. Although the techniques disclosed in the noted patents are generally successful in implementation, problems can be encountered particularly with closures having a fairly large diameter, in which the stop flange may not be inverted properly employing the noted techniques. A general object of the present disclosure is to provide an apparatus and method for inverting the stop flange on a tamper-indicating closure which address this problem in the art.

The present disclosure embodies a number of aspects that can be implemented separately from or in combination with each other.

An apparatus for inverting the stop flange on a tamper-indicating closure, from an axially outwardly oriented position as molded to an axially inwardly oriented position for use, in accordance with one aspect of the present disclosure, includes a support base for supporting the closure such that the stop flange as molded is spaced from and oriented away from the support base. A pedestal is movably carried by the support base at a position spaced from the support base. A locator ring is carried by the pedestal and movable with the pedestal to engage the stop flange on a closure carried by the support base and to bend the stop flange radially inwardly. An inversion ring moves through the locator ring to engage and invert the stop flange that is bent radially inwardly by the locator ring. The support base preferably is movable toward the locator ring and the inversion ring, such that the stop flange on the closure supported on the support base engages the locator ring and the inversion ring in sequence. The locator ring preferably has a surface that engages and rounds the closure prior to inversion of the stop flange.

An apparatus for inverting the stop flange on a tamper-indicating closure, in accordance with another aspect of the present disclosure, includes a support base for supporting the closure such that the stop flange as molded is spaced from and oriented away from the support base. A thread pilot is spaced from and opposed to the support base. A circumferentially continuous locator ring surrounds the thread pilot, and a circumferentially continuous inversion ring is disposed between the locator ring and the thread pilot. The support base is movable toward the thread pilot, the locator ring and the inversion ring first to engage the thread pilot and clamp the closure on the support base, then to engage the locator ring preliminarily to bend the stop flange radially inwardly, and then to engage the inversion ring further and finally to bend the stop flange to an axially inward orientation for use.

A method of inverting a stop flange on a tamper-indicating closure in accordance with a further aspect of the disclosure includes engaging the stop flange with a circumferentially continuous locator ring to bend the entire stop flange to a radially inward orientation, and then engaging the stop flange with a circumferentially continuous inversion ring further to bend the stop flange to an axially inward orientation for use.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figures 1, 2A:
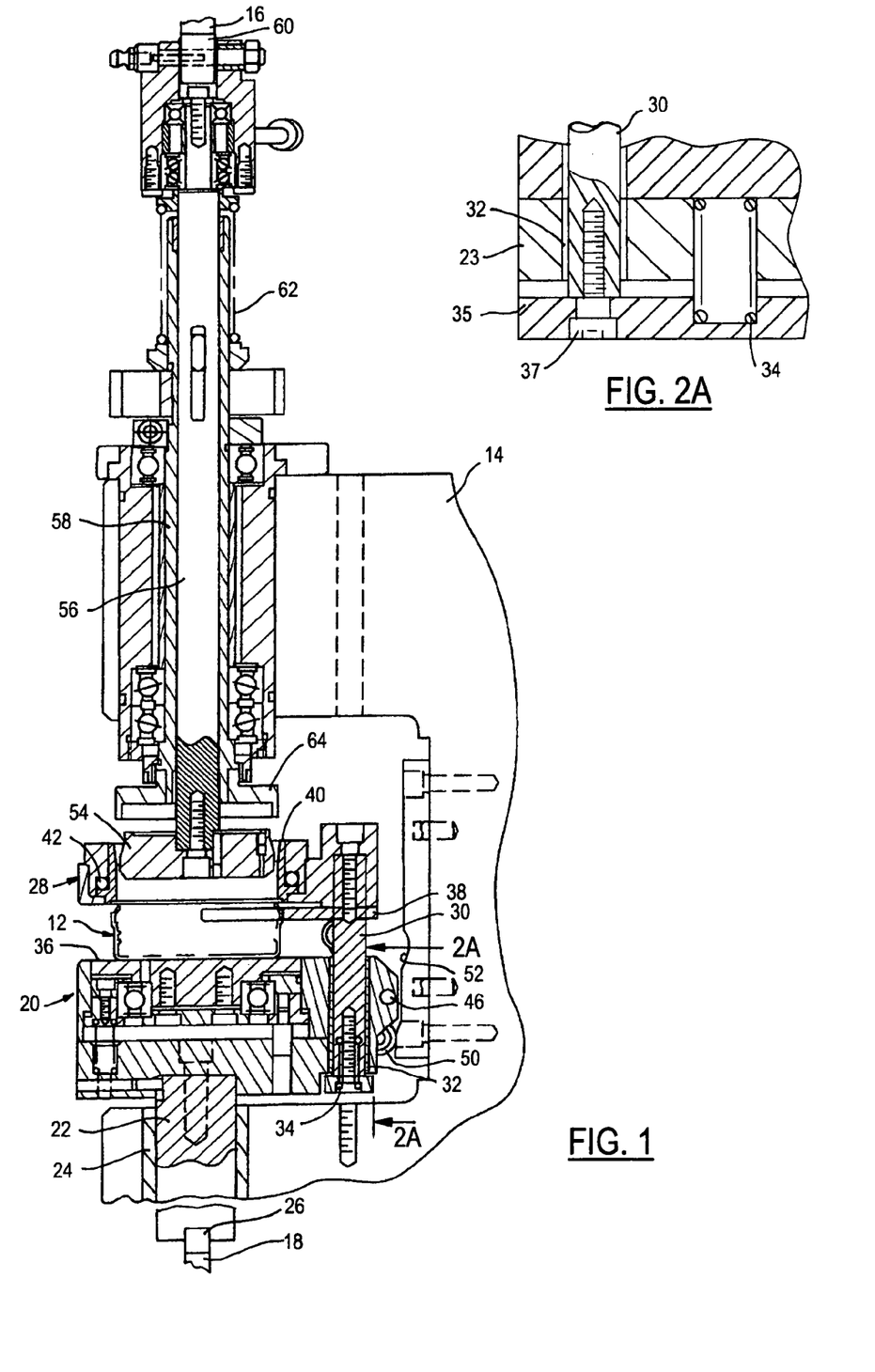
FIG. 1 is a fragmentary sectional view of an apparatus for inverting the stop flange on a tamper-indicating closure in accordance with one presently preferred embodiment of the disclosure.
FIG. 2A is a fragmentary sectional view taken substantially along the line 2A-2A in FIG. 2.
Figure 2:
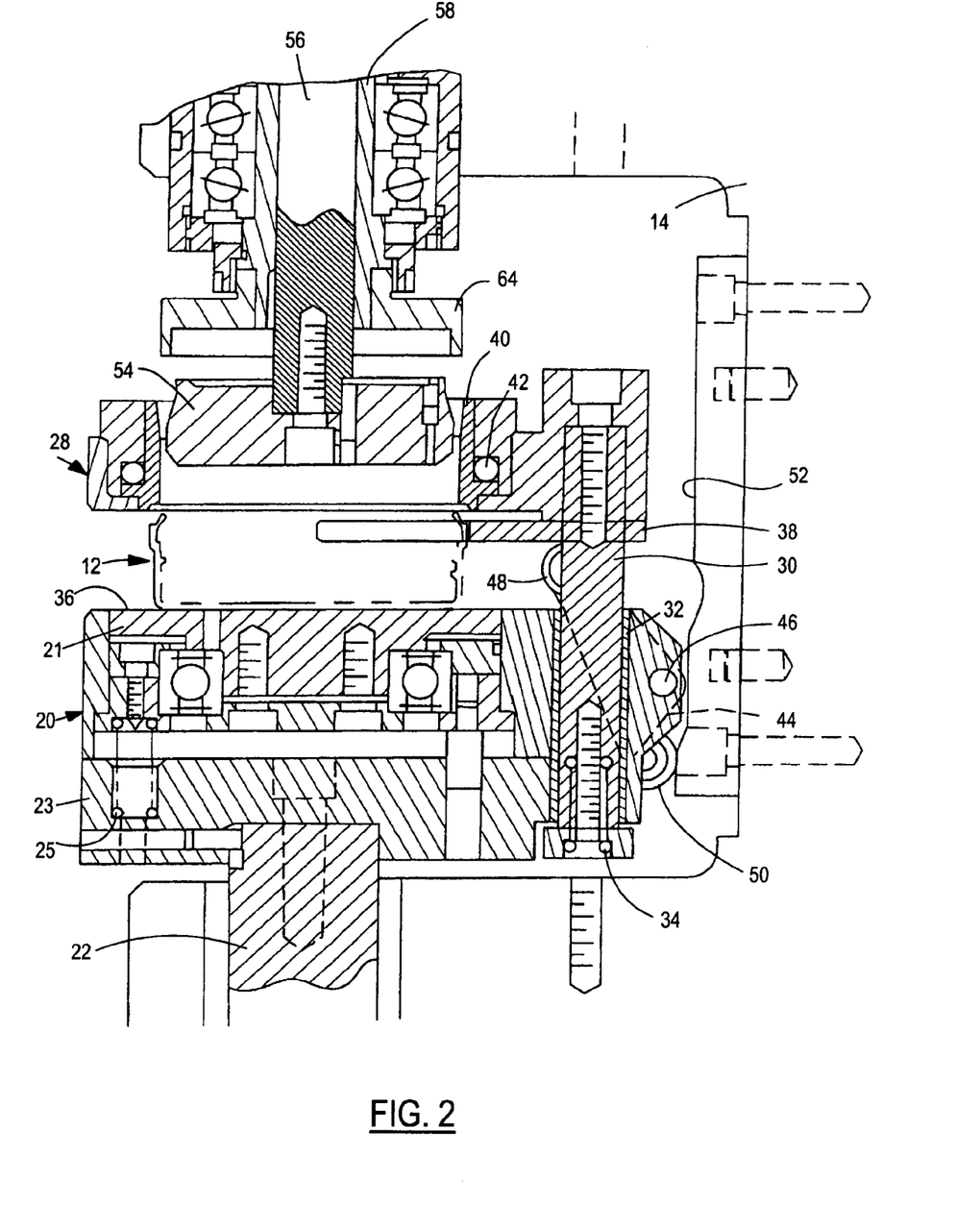
FIG. 2 is a fragmentary view of a portion of FIG. 1 on an enlarged scale.
Figure 3:
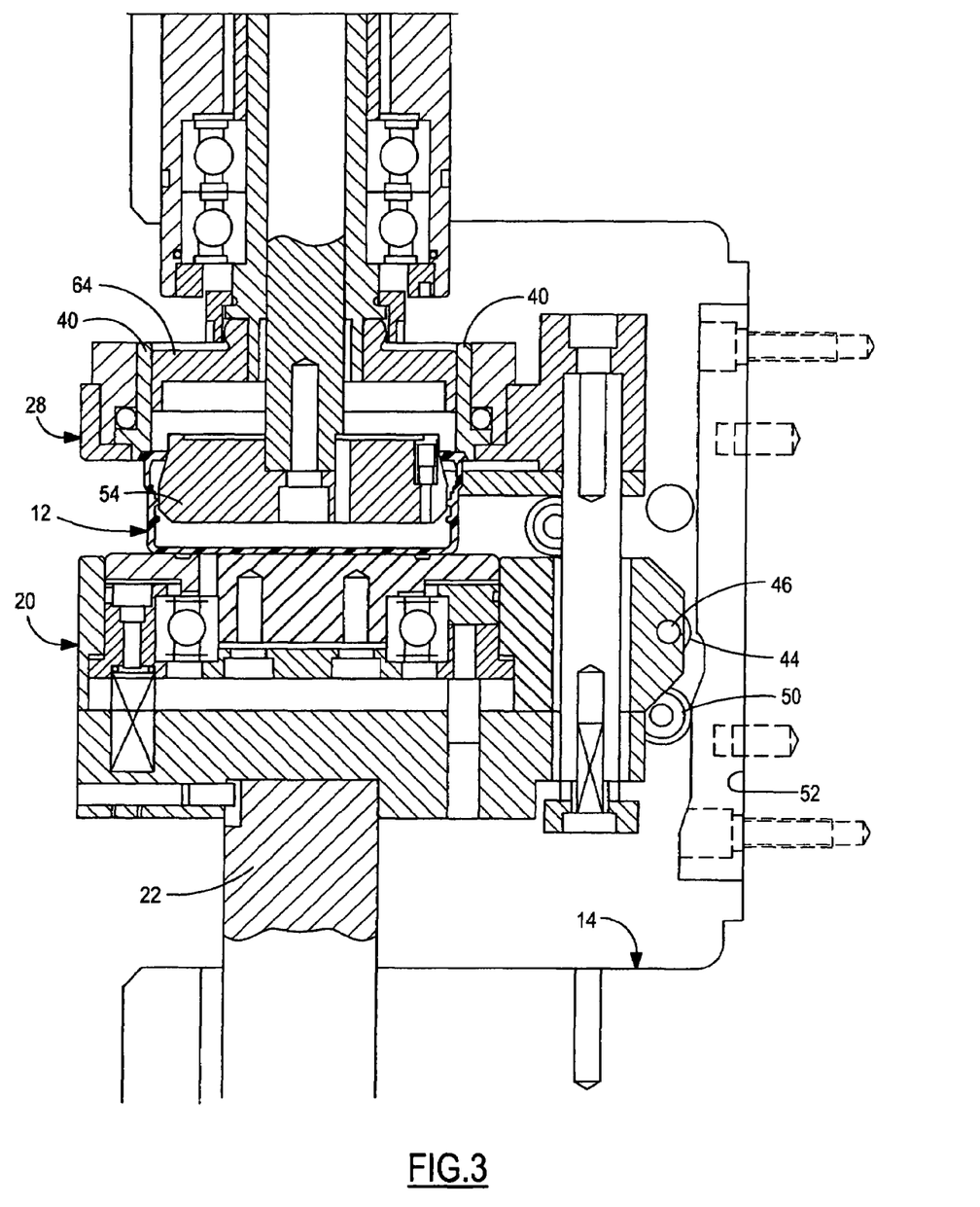
FIGS. 3-7 are views similar to that of FIG. 2 but illustrating the apparatus in sequential stages of operation.

FIGS. 1-2 illustrate an apparatus 10 for inverting a stop flange on a tamper-indicating closure 12 in accordance with one presently preferred embodiment of the disclosure. Apparatus 10 includes a support frame 14, which may be the frame of a rotating carousel or turret for example. A pair of cams 16,18 are disposed in fixed positions adjacent to frame 14. A support base 20 includes a deck 21 mounted within a frame 23 and biased upwardly within frame 23 by at least one coil spring 25. Frame 23 of support base 20 is mounted on a shaft or rod 22 that is slidably mounted on frame 14, such as by slide bearings 24 for example. A roller 26 or other suitable follower operatively couples rod 22 to cam 18 for moving support base 20 as a function of motion of frame 14.

A pedestal 28 is carried by a rod 30 that is slidably mounted on support base 20, such as by a sleeve bearing 32, for motion toward and away from the upwardly facing support surface 36 of the support base. A coil spring 34 biases pedestal 28 toward support surface 36 of support base 20, preferably by acting against an end plate 35 that is coupled to rod 30 by a cap screw 37 (FIG. 2A). A locator bracket 38 is mounted on pedestal 28 for externally engaging the skirt of a closure 12 on support surface 36 and thereby preliminarily locating closure shell 12 with respect to pedestal 28 and support base 20. A circumferentially continuous annular locator ring 40 is mounted by a bearing 42 on pedestal 28 so that ring 40 can freely rotate during stop flange inversion, closure scoring and/or other operations on the closure. The interior of locator ring 40 is open. A pivot arm 44 (FIG. 2) is mounted on support base 20 by a pivot pin 46 that engages the mid portion of the pivot arm. One end of pivot arm 44 carries a roller 48 that engages the undersurface of bracket 38 on pedestal 28. The opposing end of pivot arm 44 carries a roller 50 that engages a cam 52 on frame 14. The purpose of pivot arm 44, rollers 48,50 and cam 52 is to position pedestal 28 relative to support base 20 against the force of spring 34 during motion of the support base, as will be described.

A thread pilot 54 is mounted on the end of a rod or shaft 56 that preferably is movable on frame 14, such as by being slidably mounted within a sleeve 58 carried by frame 14. Thread pilot 54 has an outer surface that is coaxial with and disposed within locator ring 40. The opposing end of rod 56 preferably is operatively coupled to a roller 60 that engages cam 16 to move rod 56 against the force of a coil spring 62 (FIG. 1) as a function of motion of frame 14. A circumferentially continuous inversion ring 64 is carried, such as by sleeve 58, in fixed position relative to frame 14. The outer periphery of inversion ring 64 is at a constant diameter that is greater than the outer diameter of thread pilot 54 but less than the inner diameter of locator ring 40, so that inversion ring 64 can be received between thread pilot 54 and locator ring 40 as will be described.

FIGS. 1 and 2 illustrate apparatus 10 in the fully open position, in which a closure 12 is inserted for inversion of its stop flange and removed following inversion. FIGS. 3-7 illustrate apparatus 20 at sequential stages of operation for stop flange inversion. In the position of FIGS. 1 and 2, the closure 12 is placed by suitable tooling on support surface 36 of support base 20 and in substantial engagement with locator bracket 38 so that the closure is substantially coaxial with thread pilot 54. The closure opens upwardly so that the stop flange to be inverted faces away from the surface 36. Between the positions of FIGS. 2 and 3, support base 20 is moved upwardly by rod 22 so as to move closure shell 12 over thread pilot 54. The lower circumferential edge of thread pilot 54 is tapered to engage the internal thread segments on the closure skirt and locate or pilot the closure to a position coaxial with the thread pilot. Upward motion of support base 20 also functions through pivot arm 44 and cam 52 to begin to lower locator ring 40 toward the open end of closure 12. (It will be appreciated that directional words such as "upper" and "lower" are employed by way of description and not limitation with respect to the orientation of the apparatus illustrated in the drawings.)

Figure 4:
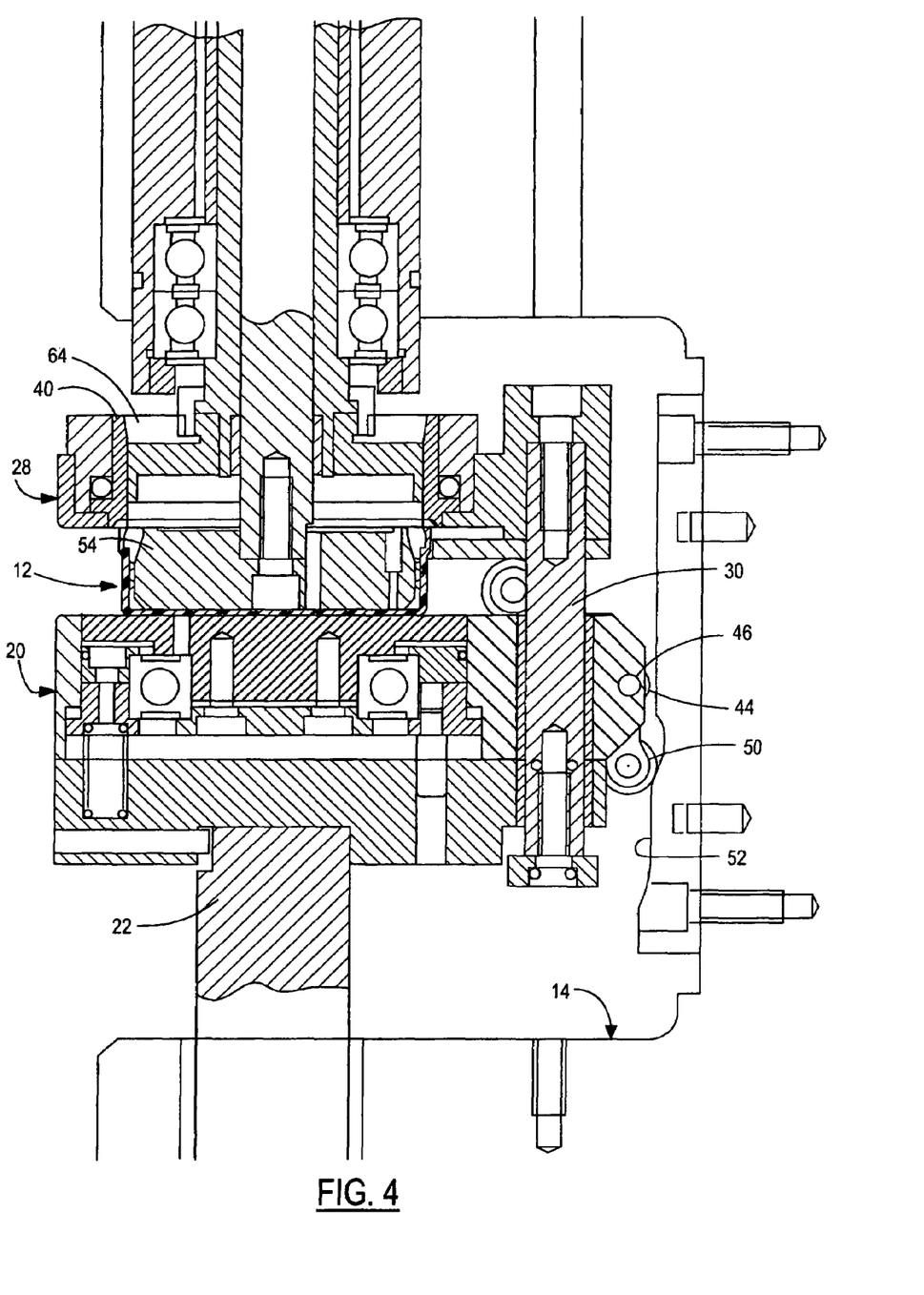
Figure 4A:
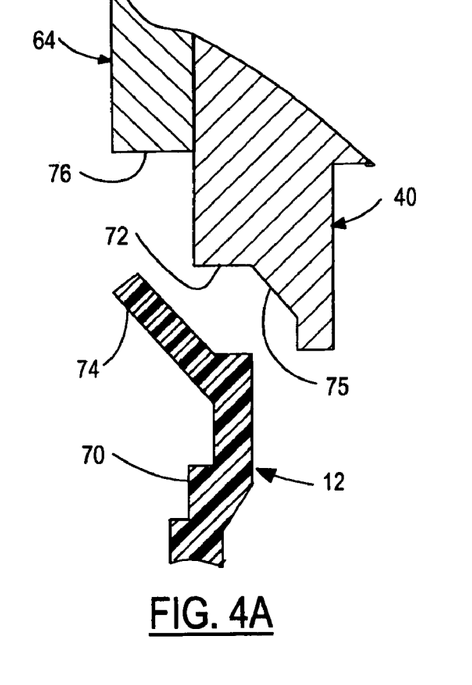
FIGS. 4A, 5A, 6A and 7A are fragmentary sectional views on an enlarged scale of respective portions of FIGS. 4, 5, 6 and 7.

Continued upward motion of support base 20 brings shell 12 into the fully engaged position relative to thread pilot 54, as shown in FIG. 4. Thread pilot 54 locates closure 12 laterally by engagement with the inside surfaces of the thread segments on the closure skirt and firmly clamps closure 12 against surface 36 of support base 20. Any excess motion of support base 20 and closure 12 against thread pilot 54 is taken up by motion of deck 21 against spring(s) 25, as illustrated in FIG. 4. At this point, as shown in FIG. 4A, locator ring 40 and inversion ring 64 are still spaced from stop flange 74 on closure skirt 70. Continued upward motion of support base 20, from the position of FIG. 4 to the position of FIG. 5, pushes thread locator 54 and rod 56 upwardly, which motion preferably is permitted by the contour of upper cam 16 (FIG. 1), or alternatively could be accommodated by a suitable spring. In the meantime, pedestal 28 is lowered relative to support base 20, by operation of cam 52 and pivot arm 44, so as to bring locator ring 40 into engagement with the free edge of closure skirt 70, as shown in FIG. 5A. A shoulder 72 on locator ring 40 engages the free edge of closure skirt 70, and engages the stop flange 74 mold in integrally with the closure skirt, preliminarily to bend to stop flange from the axially outward orientation as molded illustrated in FIG. 4A to a radially inward orientation illustrated in FIG. 5A. This preliminary bending takes place where flange 74 joins skirt 70. The entire flange is bodily bent in one motion around this hinge point. Inversion ring 64 is still spaced from stop flange 74.

Radially outboard of shoulder 72 on locator ring 40, there preferably is provided a radially outwardly flaring surface 75 (FIGS. 4A, 5A, 6A and 7A), which preferably is conical. Surface 75 engages the radially outer edge of skirt 70 prior to engagement by shoulder 72 and inversion ring 64, and acts to round the skirt—i.e., to make the skirt substantially cylindrical prior to engagement by inversion ring 64. With closures of substantial diameter, such as 63 mm or larger, the skirt tends to ovalize after removal from the forming mold, which makes stop flange inversion difficult using prior techniques. This preferred rounding feature of the present disclosure addresses this difficulty. After stop flange inversion and removal of the closure from the inversion apparatus, the skirt may again ovalize.

Figure 5:
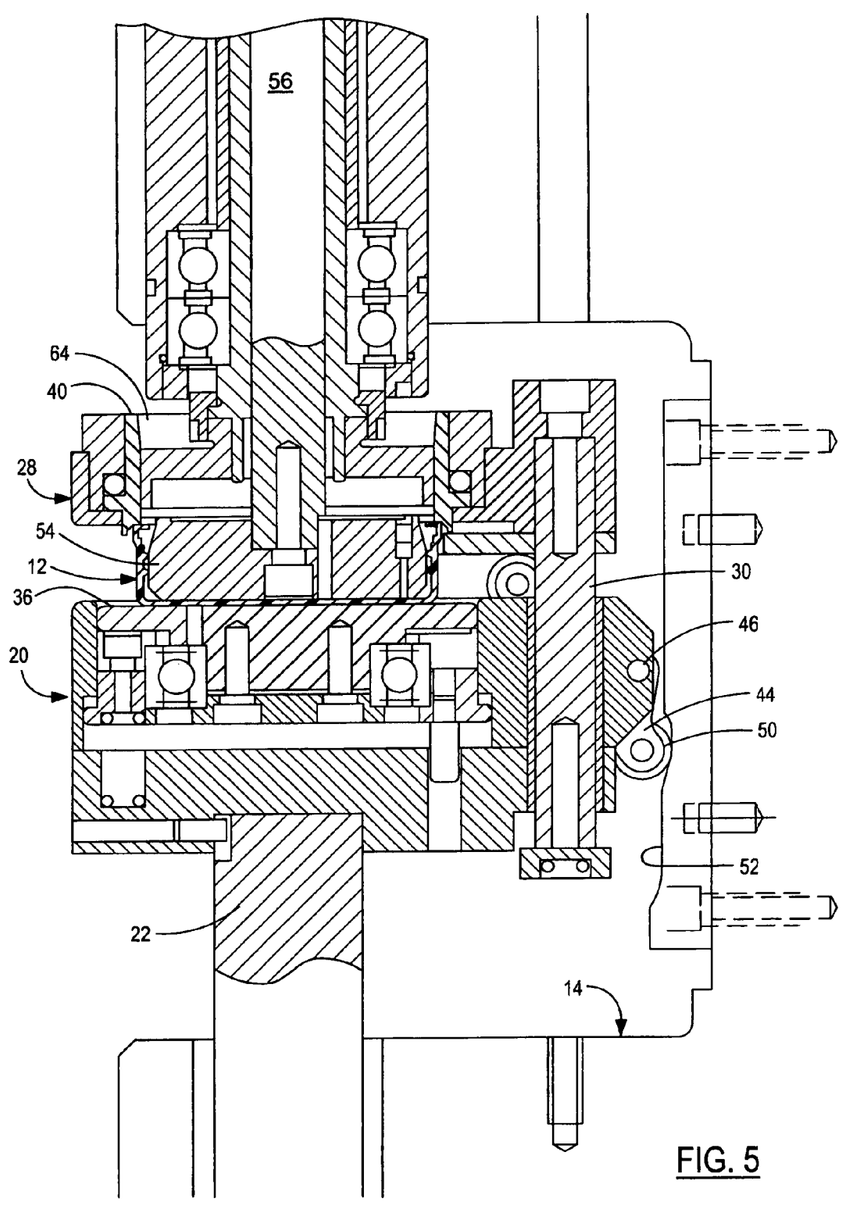
Figure 5A:
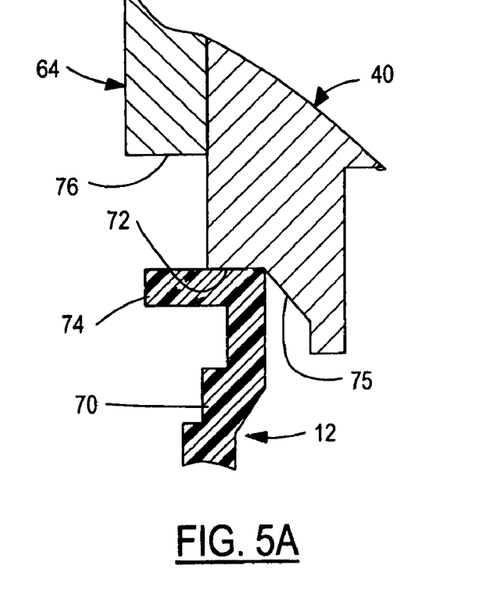
Figure 6:
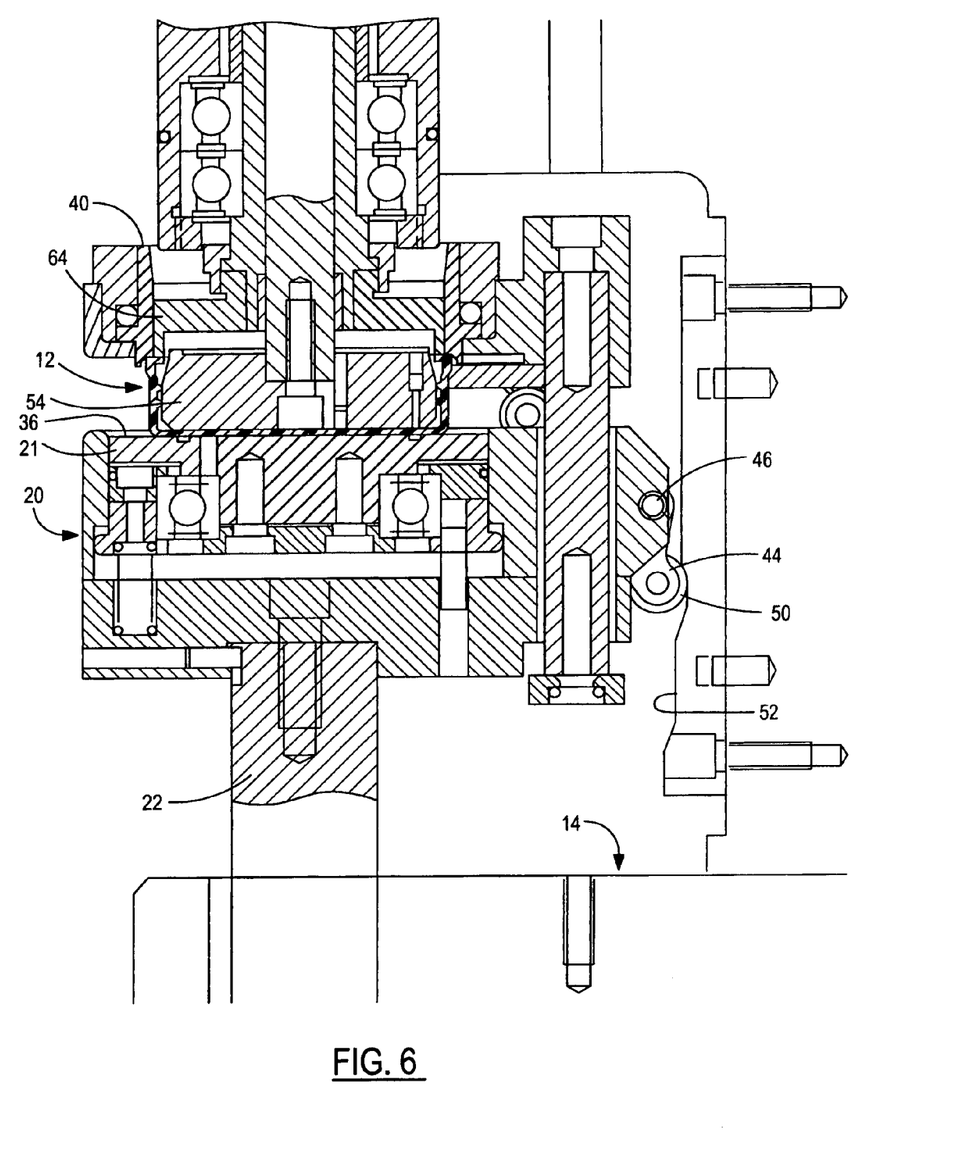
Figure 6A:
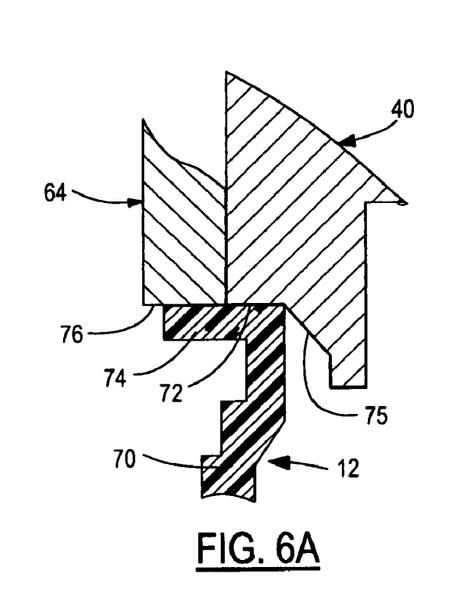
Figure 7:
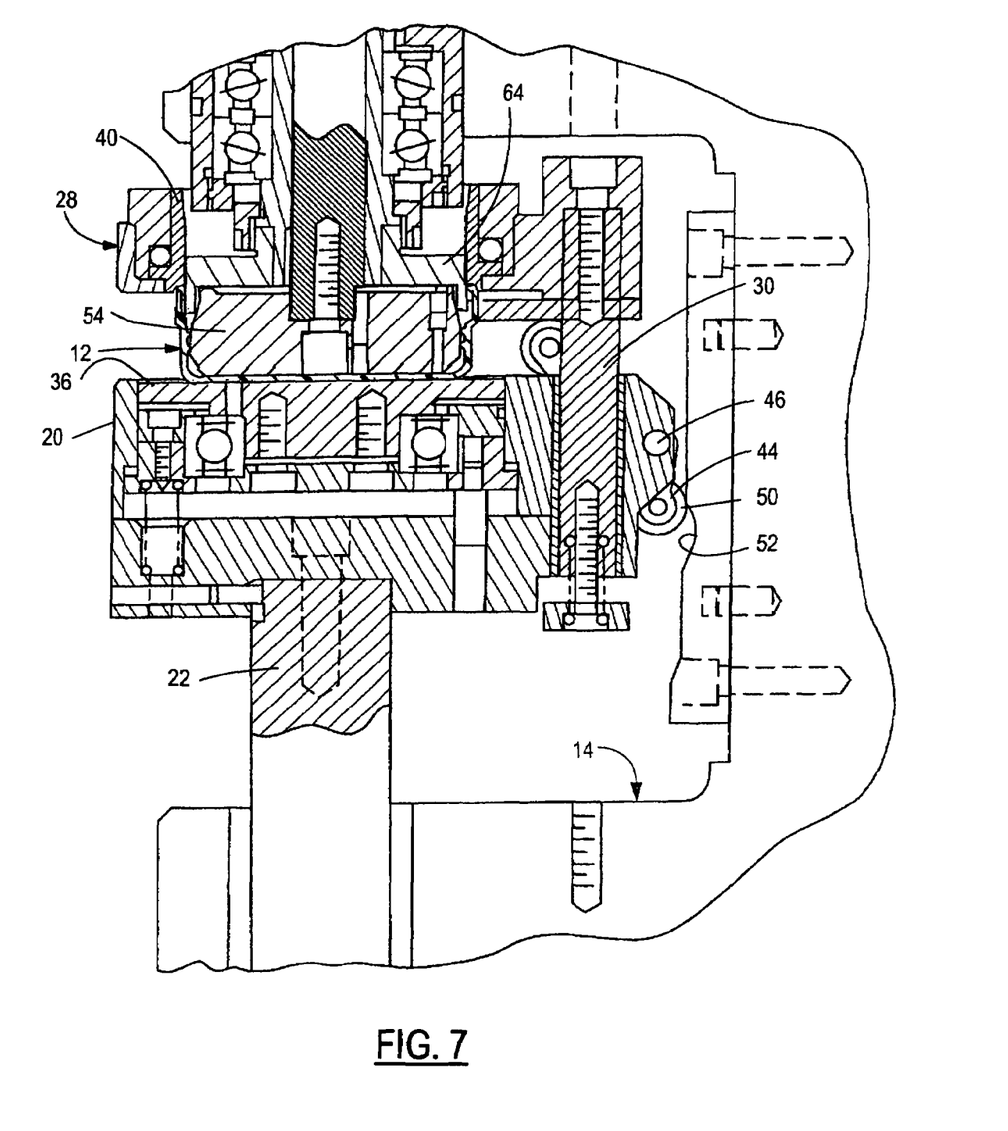
Figure 7A:
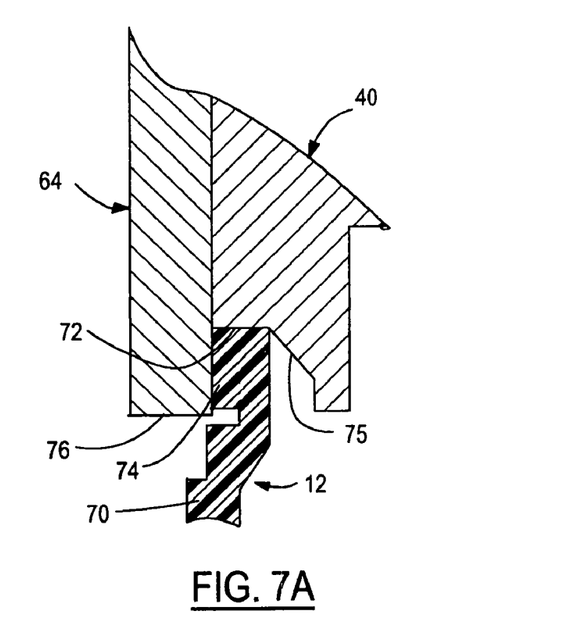

Further continued upward motion of support base 20, from the position of FIG. 5 to the position of FIG. 6, brings the now radially inwardly oriented stop flange 74 into engagement with the undersurface 76 of inversion ring 64. FIGS. 6 and 6A illustrate inversion ring 64 just beginning to engage stop flange 74. Further continued motion of support base 20, from the position of FIGS. 6 and 6A to the position of FIGS. 7 and 7A, moves locator ring 40 and closure stop flange 74 over undersurface 76 of inversion ring 64 finally to bend the stop flange to the fully axially inwardly oriented position illustrated in FIG. 7A. At this point, the stop flange inversion operation is complete, and support base 20 can be retracted. Inasmuch as stop flange 74 is circumferentially continuous, the stop flange will remain in the inverted orientation following removal of inversion ring 64 and locator ring 40.

There thus have been disclosed an apparatus and method for inverting the stop flange on a tamper-indicating closure that fully satisfy all of the objects and aims previously set forth. The disclosure has been presented in connection with a presently preferred embodiment of the apparatus, and a number of modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A method of inverting a stop flange on a tamper-indicating closure from an axially outwardly oriented position as molded to an axially inwardly oriented position for use, which includes the steps of:
   (a) bending the entire stop flange from the axially outwardly oriented position axially outward of a free edge of a skirt of the closure to a radially inward orientation radially inward of the free edge of the skirt by engaging the stop flange with a circumferentially continuous locator ring, and engaging the free edge of said closure skirt with the locator ring, and then (b) bending the entire stop flange from the radially inward orientation to the axially inward orientation axially inward of the free edge of the skirt by engaging the stop flange with a circumferentially continuous inversion ring.

2. the method set forth in claim 1 wherein said step (a) is continued during said step (b).

3. the method set forth in claim 2 wherein said step (a) includes engaging the closure with a conical surface on said locator ring to round said closure prior to said step (b).

4. A method of inverting a stop flange on a tamper-indicating closure from an axially outwardly oriented position as molded to an axially inwardly oriented position for use, which includes the steps of:

(a) rounding a skirt of the closure by engaging a radially outer edge of the closure skirt with a flaring surface of a circumferentially continuous locator ring, and then (b) bending the stop flange to a radially inward orientation by engaging the stop flange with a shoulder of the circumferentially continuous locator ring and engaging a free edge of the closure skirt with the shoulder, and then (c) bending the stop flange to the axially inward orientation axially inward of the free edge of the closure skirt by engaging the stop flange with a circumferentially continuous inversion ring.

5. The method set forth in claim 4 wherein the flaring surface is conical.

* * * * *